United States Patent
Prakash et al.

(10) Patent No.: US 8,854,955 B2
(45) Date of Patent: Oct. 7, 2014

(54) MESH RESTORATION AND BANDWIDTH ALLOCATION SYSTEMS AND METHODS FOR SHARED RISK CONNECTION GROUPS

(71) Applicants: Anurag Prakash, Noida (IN); Mohit Chhillar, Delhi (IN); Pradeep Kumar, Haryana (IN); Rajagopalan Kannan, Haryana (IN)

(72) Inventors: Anurag Prakash, Noida (IN); Mohit Chhillar, Delhi (IN); Pradeep Kumar, Haryana (IN); Rajagopalan Kannan, Haryana (IN)

(73) Assignee: Ciena Corporation, Hanover, MD (US)

( * ) Notice: Subject to any disclaimer, the term of this patent is extended or adjusted under 35 U.S.C. 154(b) by 193 days.

(21) Appl. No.: 13/714,516

(22) Filed: Dec. 14, 2012

(65) Prior Publication Data

US 2014/0126899 A1    May 8, 2014

(51) Int. Cl.
    H04J 1/16       (2006.01)
    H04B 10/032     (2013.01)
(52) U.S. Cl.
    CPC .................................. H04B 10/032 (2013.01)
    USPC .......................... 370/228; 370/225; 370/226
(58) Field of Classification Search
    USPC .................................................. 370/216–240
    See application file for complete search history.

(56) References Cited

U.S. PATENT DOCUMENTS

| | | | |
|---|---|---|---|
| 5,781,529 A * | 7/1998 | Liang et al. ................... | 370/218 |
| 6,697,329 B1 * | 2/2004 | McAllister et al. ........... | 370/235 |
| 7,095,712 B2 * | 8/2006 | Kinoshita et al. ............. | 370/217 |
| 7,835,267 B2 | 11/2010 | Zamfir et al. | |
| 7,855,949 B1 * | 12/2010 | Cortez et al. .................. | 370/216 |
| 8,259,733 B2 | 9/2012 | Conklin et al. | |
| 8,264,955 B2 | 9/2012 | Chao et al. | |
| 8,305,938 B2 | 11/2012 | Holness et al. | |
| 8,547,850 B2 * | 10/2013 | Matsubara et al. ........... | 370/237 |
| 2005/0220096 A1 | 10/2005 | Friskney et al. | |
| 2009/0310960 A1 | 12/2009 | Xu | |
| 2012/0014284 A1 | 1/2012 | Ranganathan et al. | |
| 2012/0051745 A1 | 3/2012 | Srinivasan et al. | |
| 2012/0224845 A1 | 9/2012 | Swinkels et al. | |
| 2012/0226824 A1 | 9/2012 | Trnkus et al. | |

* cited by examiner

*Primary Examiner* — Hassan Kizou
*Assistant Examiner* — Ashil Farahmand
(74) *Attorney, Agent, or Firm* — Clements Bernard PLLC; Christopher L. Bernard; Lawrence A. Baratta, Jr.

(57) ABSTRACT

A method, a node, and a network include mesh restoration and bandwidth allocation systems and methods for shared risk connection groups for source-based routing control planes. The mesh restoration and bandwidth allocation systems and methods utilize signaling from a node closest to a point of failure to "advise" source nodes about protect paths to be taken for a particular unidirectional or bidirectional connection in the event of mesh restoration. Specifically, the systems and methods include an ability to correlate connection information as Shared Risk Connection Groups (SRCG) to optimally utilize network bandwidth in the event of failure. The systems and methods could also be used to optimally distribute connections in a mesh network as well, trying to utilize maximum bandwidth, in distributed or centralized environments. Effectively, the systems and method distributed path computation in the network away from solely being the responsibility of source nodes.

17 Claims, 17 Drawing Sheets

MESH RESTORATION AND BANDWIDTH ALLOCATION SYSTEMS AND METHODS FOR SHARED RISK CONNECTION GROUPS

CROSS-REFERENCE TO RELATED APPLICATION(S)

The present non-provisional patent claims the benefit of priority of co-pending Indian Patent Application No. 3382/DEL/2012, filed on Nov. 2, 2012, and entitled "MESH RESTORATION AND BANDWIDTH ALLOCATION SYSTEMS AND METHODS FOR SHARED RISK CONNECTION GROUPS," the contents of which are incorporated in full by reference herein.

FIELD OF THE INVENTION

Generally, the field of art of the present disclosure pertains to optical networking systems and methods, and more particularly, to mesh restoration and bandwidth allocation systems and methods for shared risk connection groups.

BACKGROUND OF THE INVENTION

Optical networks and the like are deploying control plane systems and methods that span multiple layers (e.g., wavelength division multiplexing (WDM), Synchronous Optical Network (SONET), Synchronous Digital Hierarchy (SDH), Optical Transport Network (OTN), Ethernet, and the like). Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. Control plane systems and methods use bandwidth advertisements to notify peer nodes of available link capacity. The bandwidth advertisements exchange information over a dedicated and well known communication channel with peers on opposite ends of the communication link.

The aforementioned control planes are each source-based routing control planes meaning connections, e.g. subnetwork connections (SNCs), are routed by the source nodes. Disadvantageously with source-based routing control planes, there is no control on the sequence of restoring connections after faults even if higher bandwidth connections are released first from the point of failure. This leads to three broad categories of problems, namely network fragmentation, crank-backs for tail-end connections, and inability to prioritize higher bandwidth connections over lower bandwidth connections. With respect to network fragmentation, conventionally, there can be cases where smaller SNCs, e.g. STS3c/STS12c/ODU0/ODU1, reroute/restore first so as to "fragment" the network such that larger SNCs, e.g. STS24c/STS48c/ODU2/ODU3, will fail to restore. This is because of two reasons—a) smaller connections fragment the network making it no longer possible for larger connections even though a cumulative bandwidth in the network is available for the larger connections (i.e., the cumulative bandwidth is non-contiguous in the network), and b) total available bandwidth is just enough to accommodate a larger bandwidth connection. With respect to b), if the smaller bandwidth connection is established first, then larger bandwidth connection will never come up, and remaining bandwidth will go waste until there is a reconfiguration in the network.

Crank-backs generally are when blocking occurs, a signaling setup request "cranks-back" to a source node to try and alternative path which of course increases total restoration time. Conventionally, there can be a situation where larger connections, e.g., STS48c/12c SNCs re-route/restore first reserving network bandwidth such that tail End n3xSTS3c/STS1 SNCs will fail to restore, and crank-back and then retry. This can happen since routing updates are much slower than signaling and the same link can be given to multiple connections (overbooked) in an event of mesh restoration. Finally, higher bandwidth connections cannot be prioritized over lower bandwidth connections with conventional systems and methods as there is no control on the sequence of restoring connections in a source routing control plane. Further, there are no mechanisms in the aforementioned control planes for considering shared risk groups for computing protect paths. A shared risk link group (SRLG) is a set of two or more links, for which a failure of any one link in the SRLG is associated with a relatively high risk of failure of the other links in the SRLG. For example, two SNCs traversing a same physical link would be in an SRLG meaning a fault on the same physical link would affect both the SNCs. Two paths are SRLG-disjoint if no two links in the two paths are members of any one SRLG.

BRIEF SUMMARY OF THE INVENTION

In various exemplary embodiments, mesh restoration and bandwidth allocation systems and methods for shared risk connection groups are described for source-based routing control planes. The mesh restoration and bandwidth allocation systems and methods utilize signaling from a node closest to a point of failure to "advise" source nodes about protect paths to be taken for a particular unidirectional or bidirectional connection in the event of mesh restoration. Specifically, the systems and methods include an ability to correlate connection information as Shared Risk Connection Groups (SRCG) to optimally utilize network bandwidth in the event of failure. The systems and methods could also be used to optimally distribute connections in a mesh network as well, trying to utilize maximum bandwidth, in distributed or centralized environments. Effectively, the systems and method distributed path computation in the network away from solely being the responsibility of source nodes.

In an exemplary embodiment, a method includes setting up a new connection via a source routing control plane on a network; categorizing the new connection in a shared risk connection group (SRCG) during call setup of the new connection; performing a protect path computation in the background at an intermediate node in the network associated with the SRCG, wherein the protect path computation is performed to avoid crank-banks and to minimize bandwidth fragmentation due to the SRCG; responsive to a failure affecting the SRCG, releasing all connections including the new connection in the SRCG via signaling at the intermediate node; and providing the protect path computation to source nodes associated with the connections.

In another exemplary embodiment, a node includes at least one port forming a link on a network; switching means communicatively coupled to the at least one port for switching connections thereto; a controller communicatively coupled to the at least one port and the switching means; and instructions that, when executed, cause the controller to: operate a source routing control plane on the network; create a new connection via call setup with the new connection being categorized as part of a shared risk connection group (SRCG); perform a protect path computation in the background associated with the SRCG, wherein the protect path computation is performed to avoid crank-banks and to minimize bandwidth fragmentation due to the SRCG; responsive to a failure affecting the SRCG, release all connections including the new connection in the SRCG via signaling; and provide the protect path computation to source nodes associated with the connections.

In yet another exemplary embodiment, a network includes a plurality of nodes interconnected therebetween by a plurality of links; at least one shared risk connection group (SRCG) over a link of the plurality of links; and a source routing control plane operating between the plurality of nodes, wherein the source routing control plane is configured to perform path computation at a source node of a connection, and wherein intermediate nodes associated with the SRCG are configured to perform a protect path computation in the background for connections associated with the SRCG, wherein the protect path computation is performed to avoid crank-banks and to minimize bandwidth fragmentation due to the SRCG; wherein, responsive to a failure affecting the SRCG, the source routing control plane is configured to release all connections including the new connection in the SRCG via signaling and the intermediate node along with providing the protect path computation to source nodes associated with the connections.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, mesh restoration and bandwidth allocation systems and methods for shared risk connection groups are described for source-based routing control planes. The mesh restoration and bandwidth allocation systems and methods utilize signaling from a node closest to a point of failure to "advise" source nodes about protect paths to be taken for a particular unidirectional or bidirectional connection in the event of mesh restoration. Specifically, the systems and methods include an ability to correlate connection information as Shared Risk Connection Groups (SRCG) to optimally utilize network bandwidth in the event of failure. The systems and methods could also be used to optimally distribute connections in a mesh network as well, trying to utilize maximum bandwidth, in distributed or centralized environments. Effectively, the systems and method distributed path computation in the network away from solely being the responsibility of source nodes.

The mesh restoration and bandwidth allocation systems and methods enable size based priority for connections to grab available resources in the network. Optimized network bandwidth utilization is also provided thereby avoiding crank-backs or failures due to fragmentation of bandwidth. Further, early detection of crank-backs for same sized or varying size connections during restoration is also achieved. The systems and methods further do not require preemption logic which avoids mesh restoration explosions for unrelated connections (from shared risk connection groups). A protect path computation can run periodically as a background task thus not impacting runtime performance. The path computation can use a max-min flow attributes approach as described herein to optimize time taken for protect path computations.

In an exemplary embodiment, the mesh restoration and bandwidth allocation systems and methods optimally route connections in preference to the size of the connections (getting higher priority to get routed and grab shorter paths) to avoid network fragmentation. If used for protect path computations, crank-backs can be avoided for SNCs in the event of link failures, irrespective of the size of connections i.e. same versus varying sizes. The max-min flow approach reduces the number of path computations between same source and destination as well as being a tie breaker for equal admin weights paths during shortest path first (SPF) run to reduce the number of path computations between same source and destination. Additionally, the systems and methods do not require additional routing updates. The protect path computation runs on all Intermediate/Originating nodes in the background periodically or based on SRCG change triggers. It does not impact the runtime performance of the network in the event of failure. Also, the systems and methods can eliminate the need for Associated Hop Designated Transit Lists (DTLs).

Figure 1:
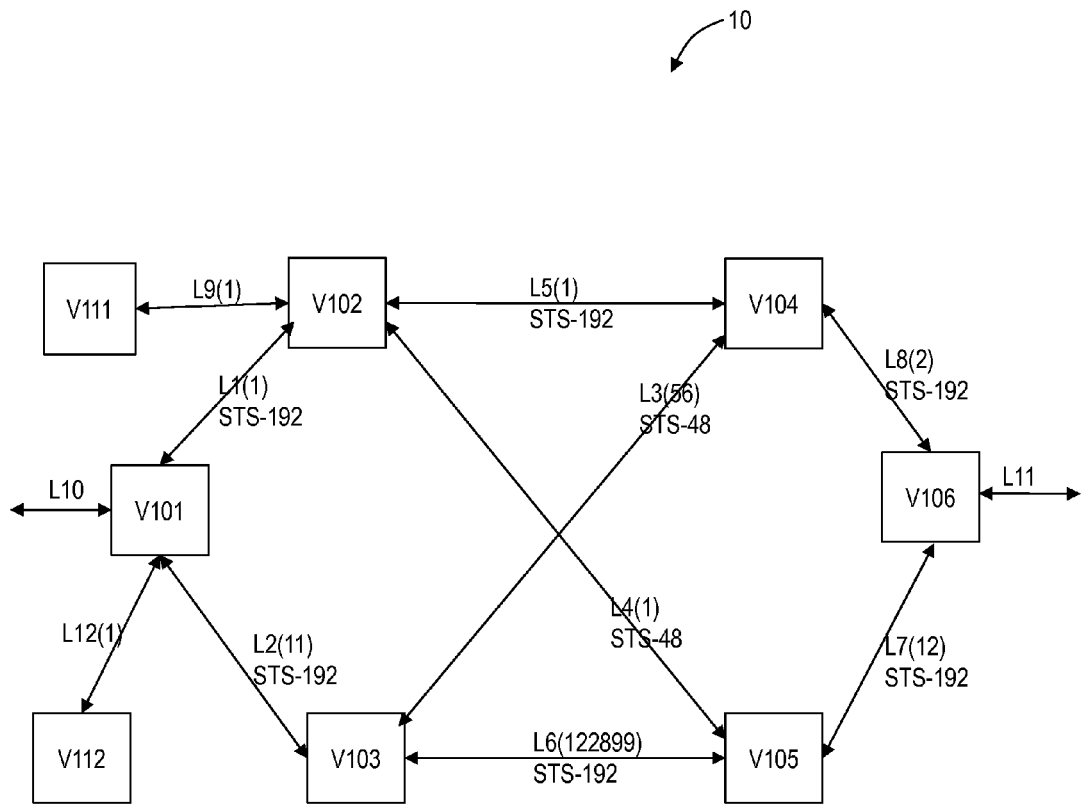
FIG. 1 is a network diagram illustrates a network of nodes V101-V112 interconnected via a plurality of links L1-L12.
Figure 7:
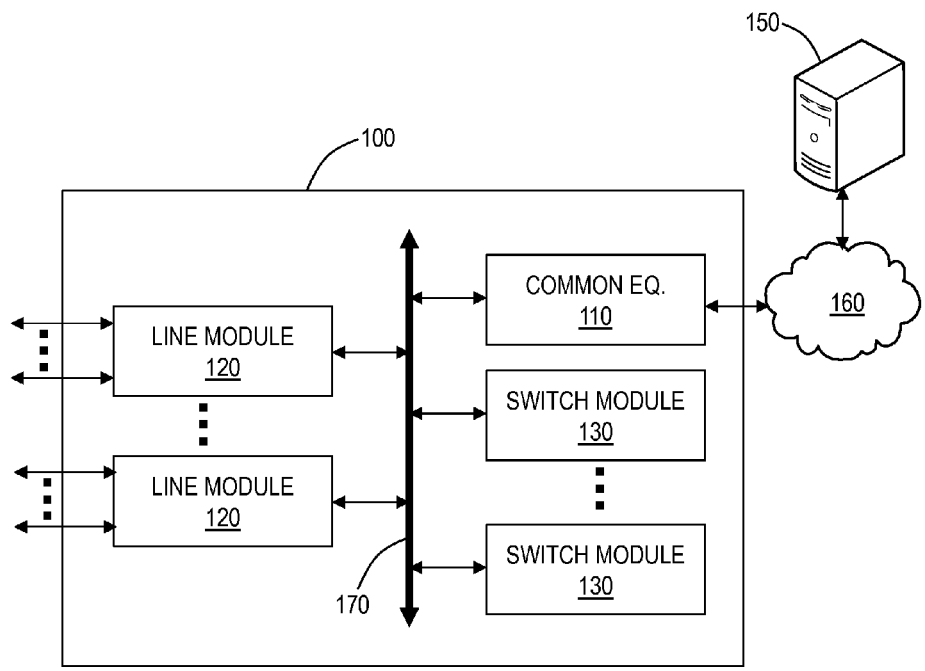
FIG. 7 is a block diagram of an exemplary node for the mesh restoration and bandwidth allocation systems and methods.

Referring to FIG. 1, in an exemplary embodiment, a network diagram illustrates a network 10 of nodes V101-V112 interconnected via a plurality of links L1-L12. The nodes V101-V112 can be network elements which include a plurality of ingress and egress ports forming the links L1-L12. Generally, the nodes V101-V112 can include optical switches support various protocols, such as Synchronous Optical Network (SONET), Synchronous Digital Hierarchy (SDH), Optical Transport Network (OTN), and the like. An exemplary node 100 is illustrated in FIG. 7. Each of the various links L1-L12 can support a varying amount of bandwidth and includes an administrative weight. In the exemplary embodiments described herein, the bandwidth is described with reference to SONET bandwidth, i.e. STS-1s, for illustration purposes, but those of ordinary skill in the art will recognize that the links L1-L11 can support other types of bandwidth such as OTN, i.e. ODUk and the like. Each of the various links L1-L12 can support a set amount of bandwidth, i.e. a certain number for each (e.g., STS-48 or STS-192 in the examples described herein), and this amount of bandwidth is determined by the overall link bandwidth size and provisioned capacity on the link. For illustration purposes, the links L1, L2, L5, L6, L7, L8 are STS-192 links and lines L3, L4 are STS-48 links. Also, each of the links L1-L12 includes an administrative weight shown in parenthesis. For illustration purposes the administrative weights are L1, L4, L5, L9, L12=1, L6=122899 (i.e., high to discourage use of the links), L7=12, L8=2, etc.

The network 10 can include a control plane operating on and/or between the nodes V101-V112. The control plane includes software, processes, algorithms, etc. that control configurable features of the network 10, such as automating discovery of the nodes V101-V112, capacity on the links L1-L12, port availability on the nodes V101-V112, connectivity between ports; dissemination of topology and bandwidth information between the nodes V101-V112; calculation and creation of paths for connections; network level protection and mesh restoration; and the like. In an exemplary embodiment, the control plane can utilize ASON, GMPLS, Resource Reservation Protocol (RSVP), OSRP, etc. Those of ordinary skill in the art will recognize the network 10 and the control plane can utilize any type control plane for controlling the nodes V101-V112 and establishing connections there between. From the perspective of the control plane, each of the links L1-L12 has various attributes associated with it such as, for example, line protection, available capacity, total capacity, administrative weight, protection bundle identification, delay, designation of boundary link, and the like. For example, a route for a connection may be computed from a source node to a destination node and optimized using various shortest path algorithms from source to a destination based on the least cost administrative weight, subject to a set of user-defined constraints.

Figure 2A:
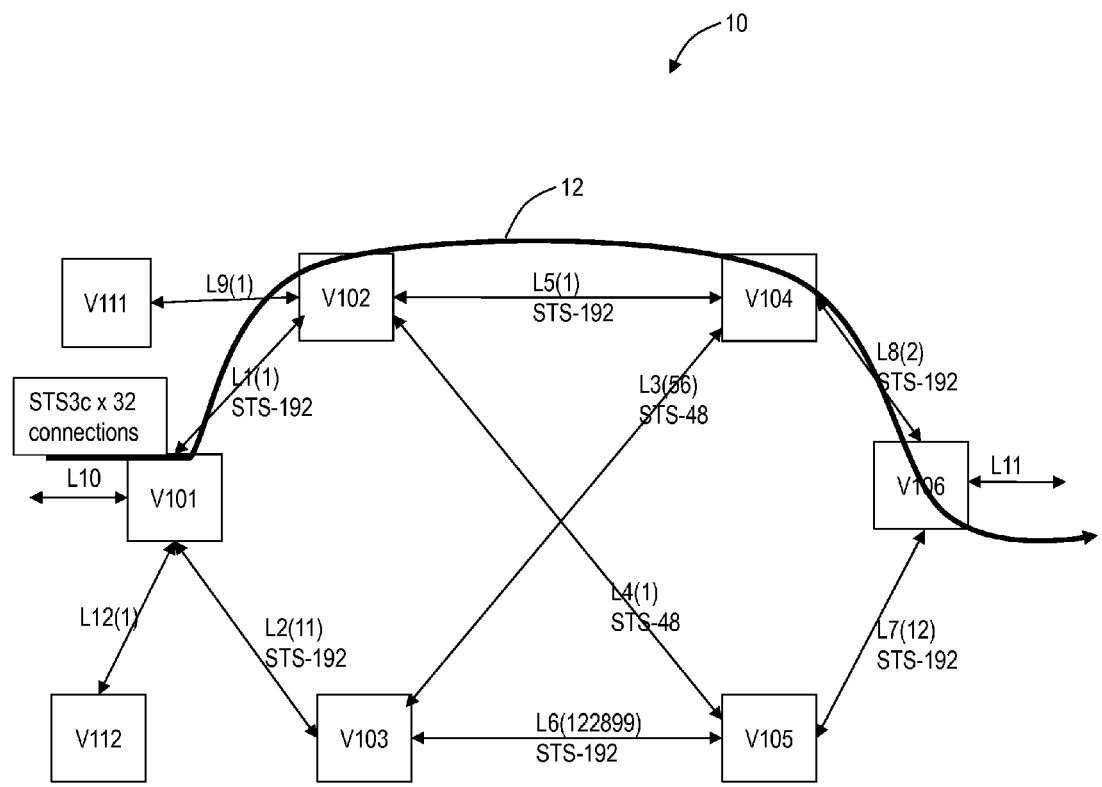
FIGS. 2A-2G are network diagrams of the network of FIG. 1 showing a crank-back for various connections due to the limitations in source-based routing control planes with SRLGs.
Figure 2B:
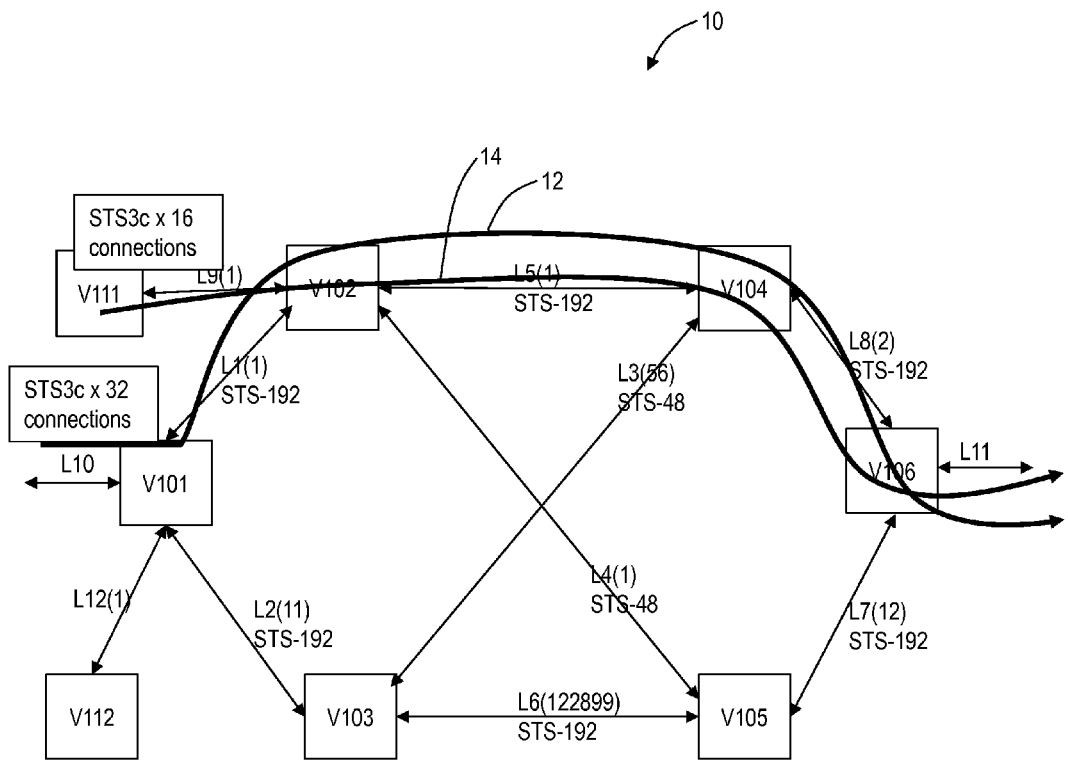
Figure 2C:
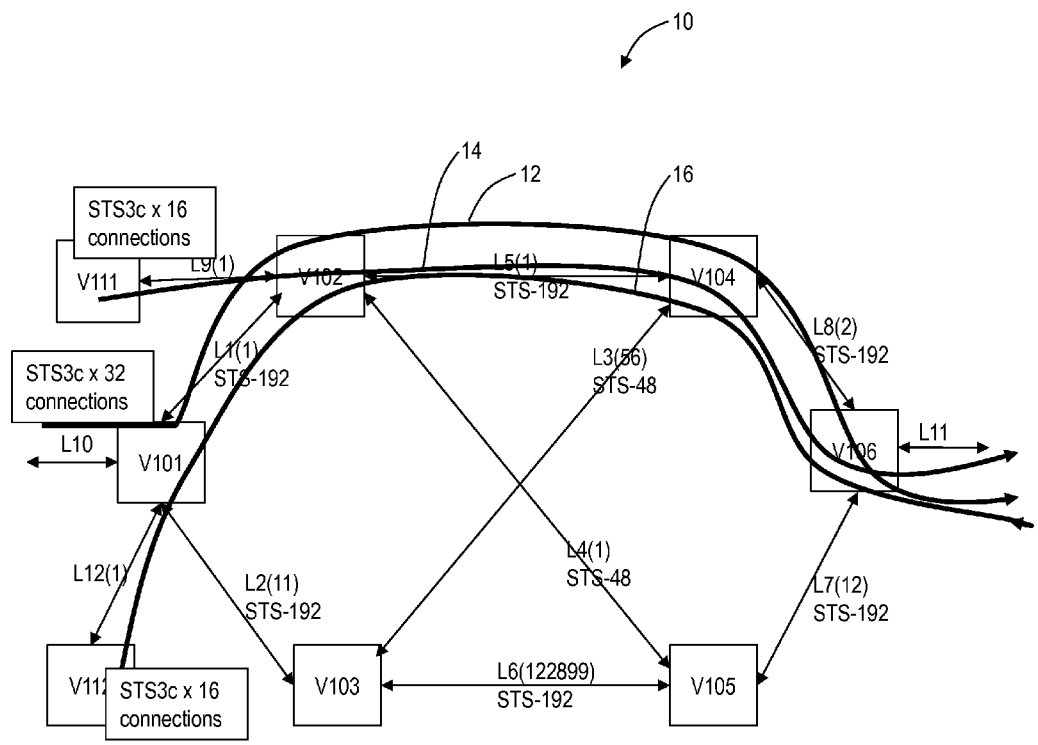
Figure 2D:
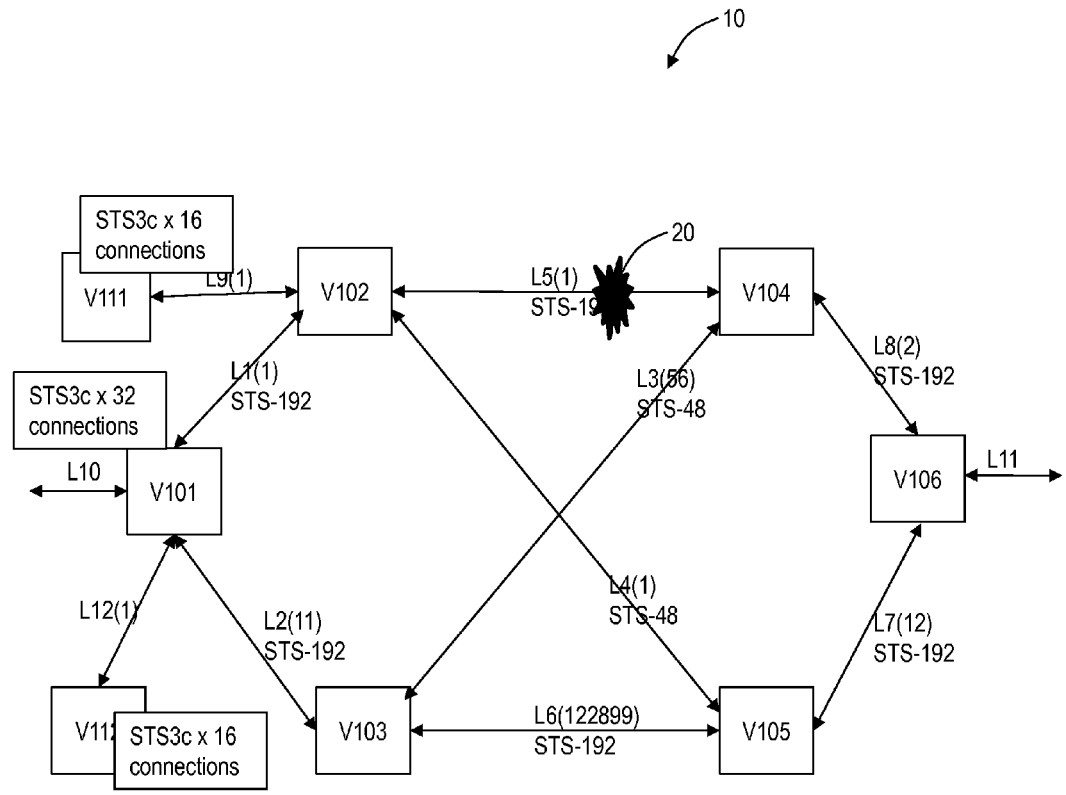

Referring to FIGS. 2A-2G, in a conventional embodiment, network diagrams illustrates the network 10 showing a crank-back for various connections due to the limitations in source-based routing control planes with SRLGs. In FIG. 2A, a first set of connections 12 is added with STS-3c×32 connections (i.e., 96 STS-1s or an STS-96) along a path including the nodes V101, V102, V104, V106. In FIG. 2B, a second set of connections 14 is added with STS-3c×16 connections (i.e., 48 STS-1s or an STS-48) along a path including the nodes V111, V102, V104, V106. In FIG. 2C, a third set of connections 16 is added with STS-3c×16 connections (i.e., 48 STS-1s or an STS-48) along a path including the nodes V112, V101, V102, V104, V106. Note, each of the set of connections 12, 14, 16 can be referred to as an SNC. Now, the link L5 is fully utilized, i.e. all STS-192s are taken with a total of 64 SNC connections (i.e. 32+16+16 from each of the set of connections 12, 14, 16), and it is a SRLG for the connections 12, 14, 16. In FIG. 2D, there is a fault 20 on the link L5 and each of the connections 12, 14, 16 is lost.

Figure 2E:
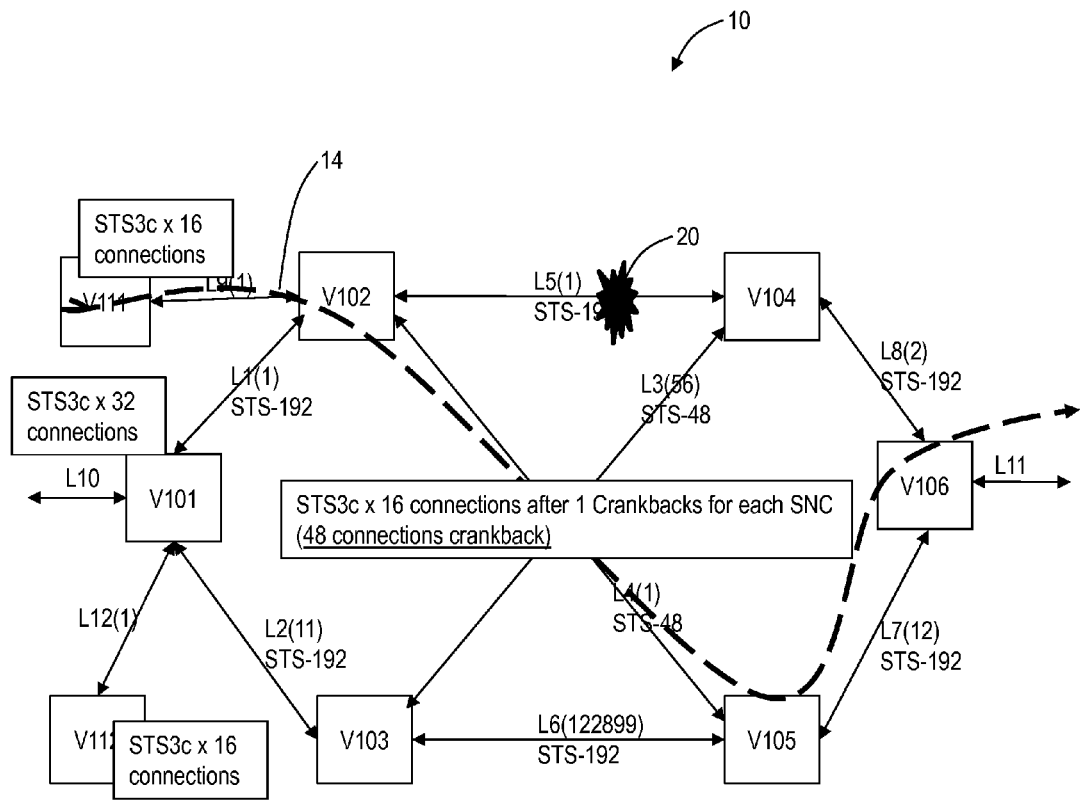
Figure 2F:
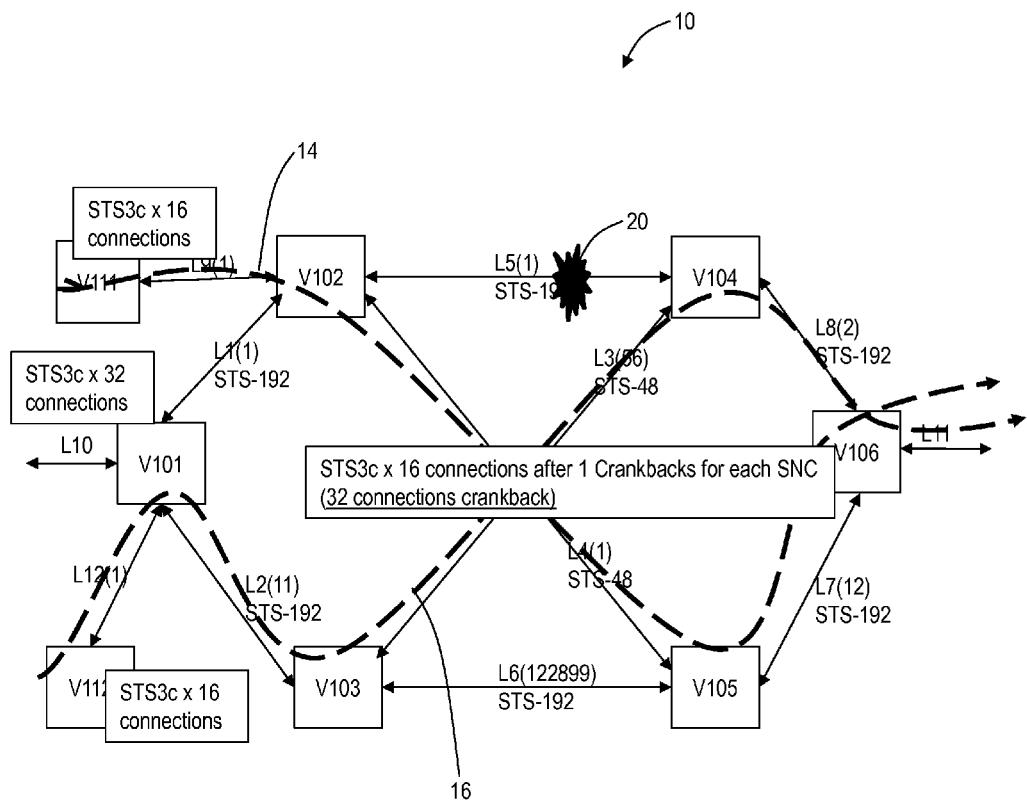
Figure 2G:
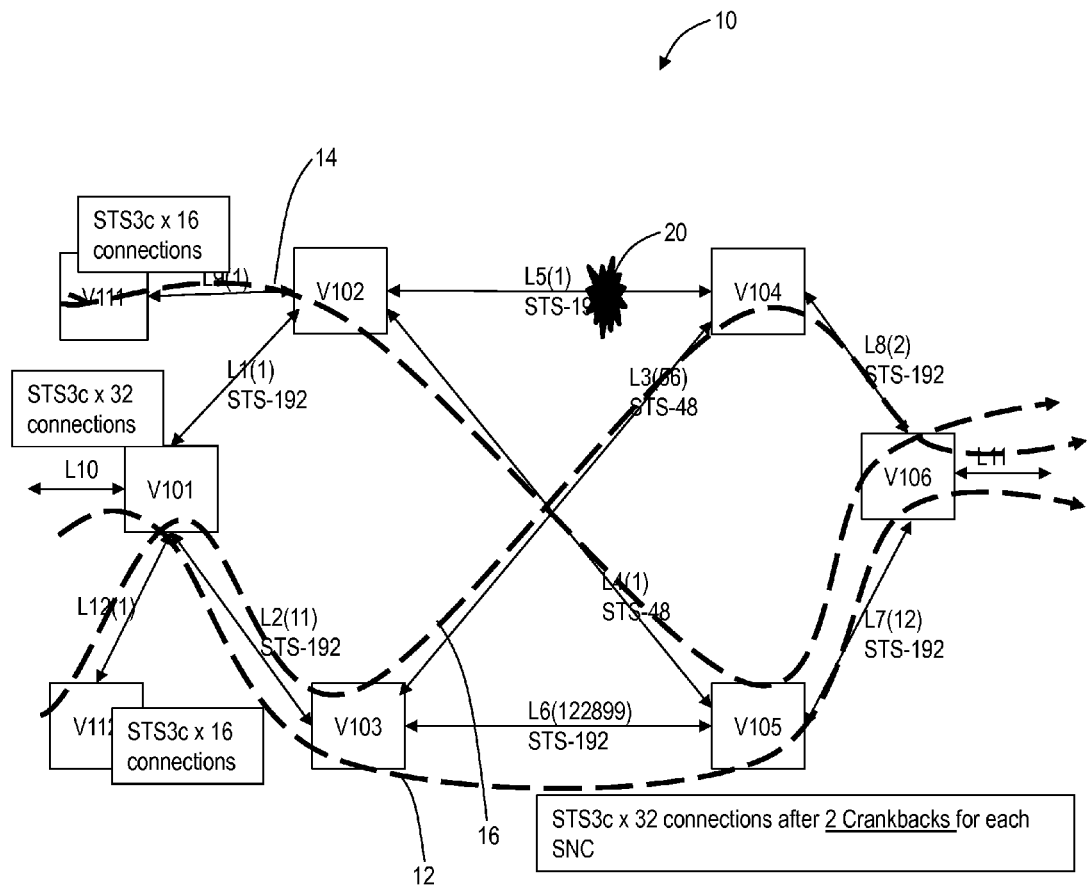

In FIG. 2E, for mesh restoration, the second set of connections 14 is restored along a path including the nodes V111, V102, V105, V106, and the first and third sets of connections 12, 16 experience a crank-back, i.e. 48 SNCs crank-back, 16 SNCs restored in FIG. 2E. In FIG. 2F, the third set of connections 16 is restored along a path including the nodes V112, V101, V103, V104, V106, and the first set of connections 12 experiences a crank-back, i.e. 32 SNCs crank-back, 32 SNCs restored in FIG. 2F. In FIG. 2G, the first set of connections 12 is restored along a path including the nodes V112, V102, V103, V105, V106. So, the first set of connections 12 experiences two crank-backs, but finally restores. This behavior as illustrated in FIGS. 2A-2G is because, as per source routing, the SNC which gets released to its head end first tries to restore first and occupies the Bandwidth. As shown in FIG. 2E, the second set of connections 14 are released first. The governing factor is the latency a release message has to reach an originating node. Assuming a same latency on all the links L1-L12, it can be assumed an SNC which has a lowest number of hops between its originating node and a point of failure will re-route its SNCs first. So it is totally un-deterministic to the control the sequence of restoring connection in this source routed control Plane.

As the connections originate from different nodes, there is no way one can correlate what other connections are restoring in the network 10 due to a common point of failure in the network. This makes (protect) path computation to simply get the shortest path first (SPF). Background (protect) path computation computes only disjoint paths to the current working path, and cannot correlate what other connections are restoring in the network due to a common point of failure. A possible option includes an Associated Hop Designated Transit List (DTL). This does allow taking a user specified path in case of failure of a particular link, but this approach needs all the information to be manually fed into the system by the user. Further, the user has to verify that multiple Associated Hop DTLs for different connections do not conflict and the user verification on associated Hop DTL could also be based on stale network topology.

In an exemplary embodiment, there can be three possible solutions to the aforementioned behavior of source-based routing control planes, namely preemption, Open Shortest Path First Traffic Engineering (OSPF-TE) Extensions in Support of Shared Mesh Restoration, and hold-off timers. For preemption, preemption logic could be used to bump low priority SNCs such as based on classes of service, bandwidth size, etc. Since implicit path computation needs to consider bandwidth which is used by other lower priority SNCs in the network, implicit path calculations during restorations need to have knowledge of low priority connections carried on each link. This requires considerable amount of flooding connection information on per link basis. Also, even trying to preempt lower priority SNCs based upon the above optimization, it will impact services on SNCs which do not have same point of failure. Further, if there are multiple priority levels then this approach can possibly lead to a multiple/recursive mesh restoration cycles due to preemption. In summary, the preemption solution works well only for user specified (explicit) Paths or scenarios deploying Extra Traffic.

OSPF-TE Extensions require extensive flooding to provide path computation modules with resource sharing information. The computation falls into the category for calculation based on SRLG sharing, i.e. the computation tries to calculate SRLG disjoint paths, but this does not solve network fragmentation problems. The hold off timer based mechanism can use an intermediate node call control scheduler with call priority and bandwidth based scheduling. The scheduler requirement should be O(1) with multiple priority queues. This can use "Nice Values" for fair weighted scheduling; this signifies the delay/backoff for lower priority connections and can be calculated, for example, as Backoff for SNC= (HopCnt2−HopCnt1)*Average Latency per hop, where HopCnt1=Number of Hops Between Originating Node and point of failure for Lower priority connection and HopCnt2=Number of Hops Between Originating Node and point of failure for higher priority connection. The idea here is lower bandwidth connections are being nice to higher priority connections by waiting and letting them go first. Doing this ensures that higher bandwidth SNCs are released first in the network and thus they get the first chance to re-route. This solution has drawbacks in the logic to determine the latency on each SNC path, possible unnecessary backoffs and delays if mesh restoration did not lead to fragmentation, and is overall not optimized.

Figure 3:
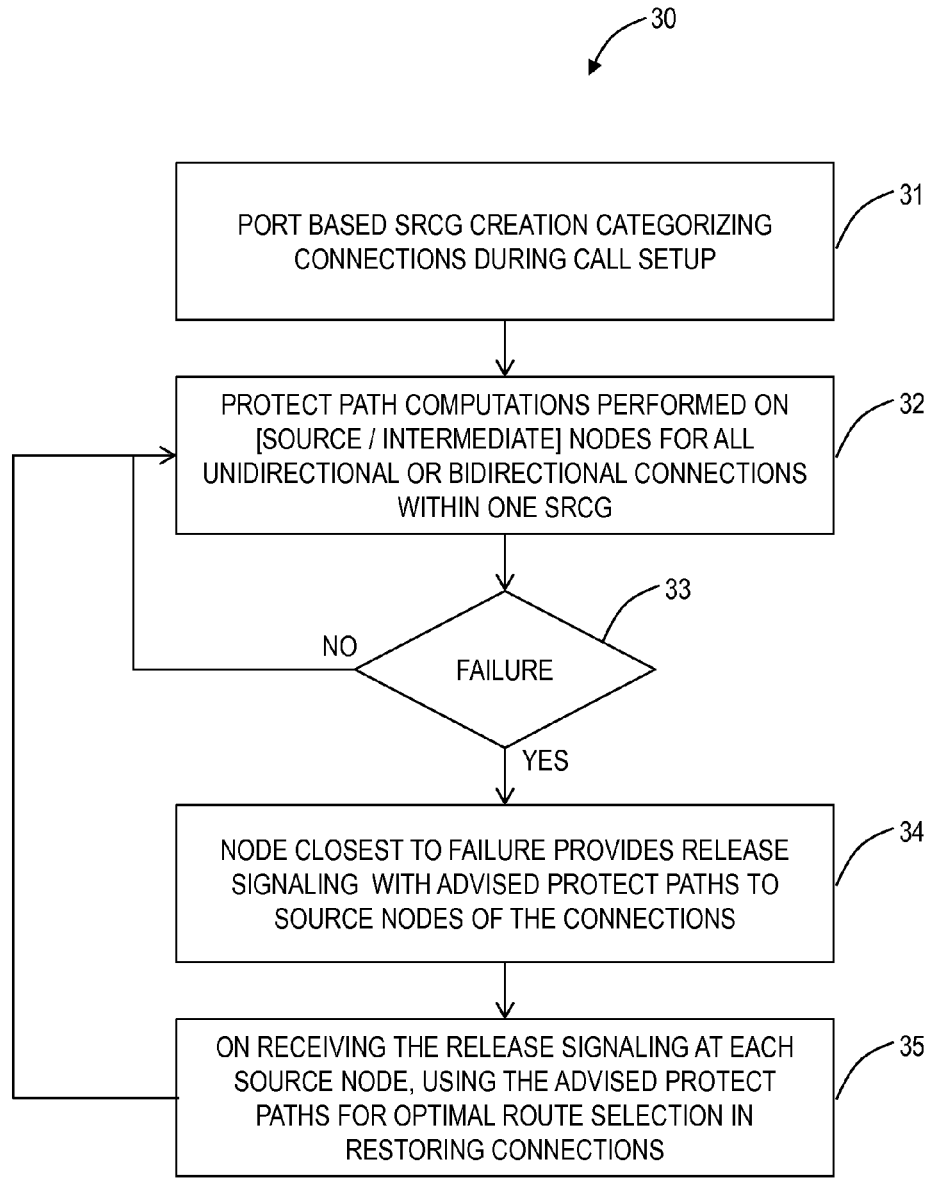
FIG. 3 is a flowchart of a shared risk connection group (SRCG) method.

Referring to FIG. 3, in an exemplary embodiment, a flowchart illustrates a shared risk connection group (SRCG) method 30. The SRCG method 30 can be implemented by and between the nodes V101-V112 as well as with the control plane operating therebetween in the network 10. First, during call setup for connections, the SRCG method 30 includes port based SRCG creation categorizing connections (step 31). Specifically, this includes categorizing connections based on bandwidth during call setup as well as including buckets that carry Source-Destination pairs for these connections. As and when the connections are setup on a link they are assigned to bandwidth based buckets. For example, there can be separate buckets for STS-1, STS-3, STS-12, STS-48, etc. connections in SONET, ODU0, ODU1, OD2, ODU3, etc. in OTN, and the like. The priority can be defined by size of the connection. Note that this acts as a tie breaker and the priority based service class can still take precedence.

Next, protect path computations are performed on Source/Intermediate nodes for all unidirectional or bidirectional connections within one SRCG (step 32). This protect path computation is referred to as "Cache Enabled and Min-Max flow based" which is described in additional detail herein. The path computation could be done on each node, or retrieved from a path computation element (PCE) with a message interface (PCE-P). If the PCE is used, it will be given SRCG data and any state information from the cache. This protect path computation can be done subsequent to call setup at various points in the background. Further, this protect path computation is performed for each SRCG in the network 10.

Upon detecting a failure (step 33), the node closest to the failure provides release signaling with advised protect paths to source nodes of all connections affected by the failure (step 34). In an exemplary embodiment, the node closest to the failure has at least one SRCG on one of its associated links affected by the failure. The advised protect paths are based on the at least one SRCG and the Cache Enabled and Min-Max flow based protect path computation. On receiving the release signaling at each source node (for the connections affected by the failure), the SRCG method 30 includes using the advised protect paths for optimal route selection in restoring connections. The SRCG method 30 can include optional control such as being enabled per SNC/Link basis to be part of the SRCG method 30, e.g. exclusive DTLs and/or subnetwork connection protection (SNCP) connections with absolute route diversity (ARD) could ignore SRCG.

Figure 4:
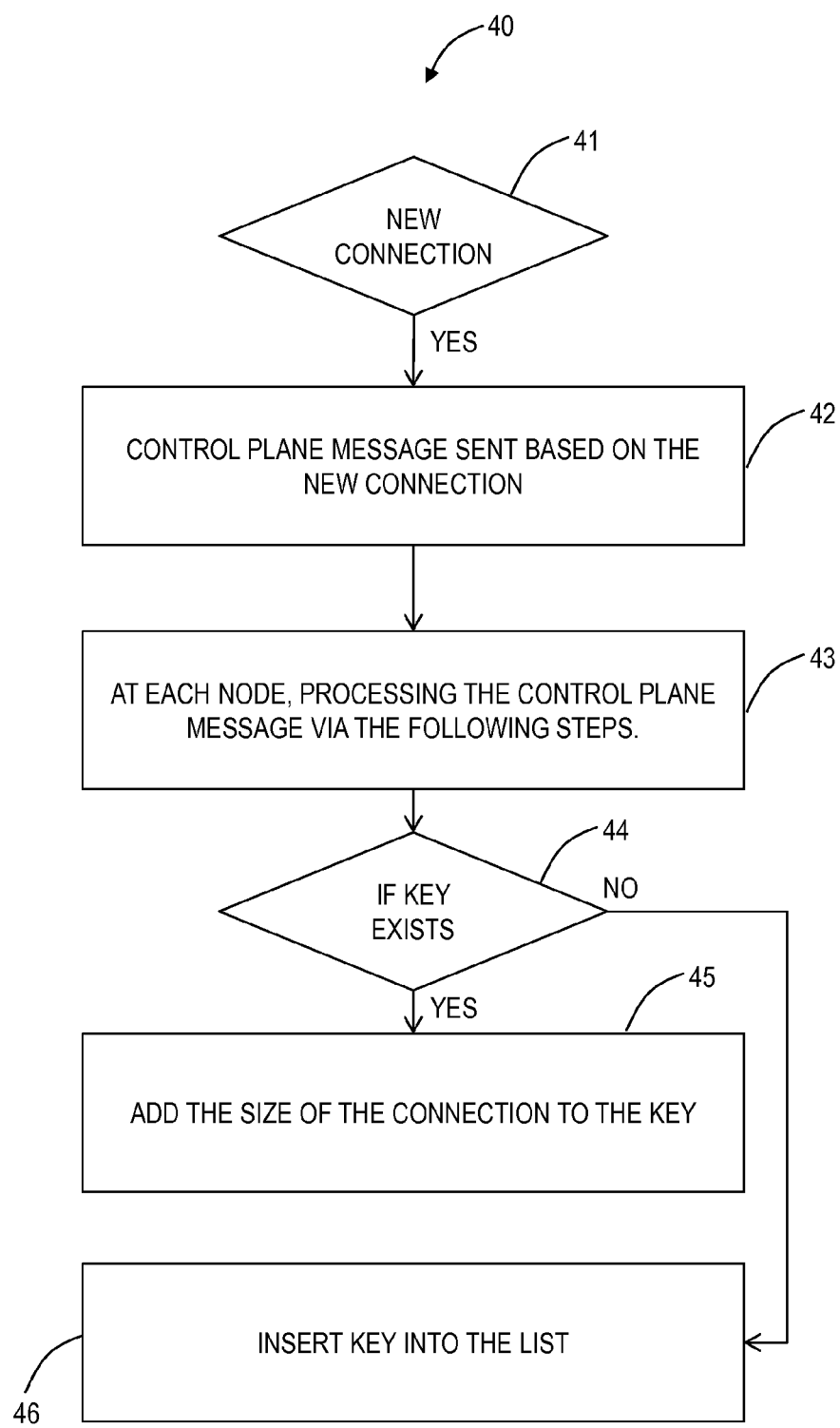
FIG. 4 is a flowchart of an SRCG processing method.

Referring to FIG. 4, in an exemplary embodiment, a flowchart illustrates an SRCG processing method 40. Similar to the SRCG method 30, the SRCG processing method 40 can be implemented by and between the nodes V101-V112 as well as with the control plane operating therebetween in the network 10. The SRCG processing method 40 can also operate with the SRCG method 30. The SRCG processing method 40 initiates with a new connection (step 41). Control plane messages are sent based on the new connection (step 42). For example, these control plane messages can be a CONNECT message in OSRP, ASON, etc. or a PATH-RESV message in GMPLS. The SRCG processing method 40 relates to managing SRCG information at each node in the network. The SRCG is a group of connections which ingress a node on a specific link or bundle, i.e. a shared risk link or bundle. This information can be contained in a data structure that is shared between the nodes via control plane messaging. For example, as part of a CONNECT message in OSRP, ASON, etc. or as part of a PATH-RESV message in GMPLS, the interface of every node can keep a list of unique key of {Source-Destination-Service Class} and the data of the key is total size. The size is cumulative of all connections for a unique (Source-Destination-Service Class), so (Source-Destination-Service Class) presents a unique ID.

At each node in the network, processing of the control plane message is performed using the following steps (step 43). Specifically, each node in the network includes a bucket list of keys by Source-Destination-Service Class. If a key exists in the bucket list (step 44), then the size of the connection from the control plane message is added to the key (step 45). If the key does not exist in the list (step 44), then the key is inserted into the list with the size of the connection from the control plane message. The foregoing table present exemplary SRCG data for an interface carrying the following SNCs:

TABLE 1 exemplary SRCG data

| Name | Source | Destination | Service Class | Size |
|------|--------|-------------|---------------|------|
| SNC1 | S1 | D1 | A | STS-12c |
| SNC2 | S1 | D1 | B | STS-3c |
| SNC3 | S1 | D1 | A | STS-24c |
| SNC4 | S1 | D1 | A | STS-3c |
| SNC5 | S2 | D4 | C | STS-12c |

The aforementioned data can include the bucket list from the SRCG processing method 40. Buckets can be defined for difference SNC sizes such as, for SONET, STS-1 to STS-3, STS-12c, STS-24c, STS-48c, etc., and, for OTN, ODU0, ODU1, ODU2, ODU3, etc.

In the Table 1, there can be three buckets—bucket 1 for STS-3c, bucket 2 for STS-12c, and bucket 3 for STS-24c. The buckets can each include the (Source-Destination-Service Class). For example, bucket 1 can include S2+D1+B with a value of 3 and S1+D1+A with a value of 3, bucket 2 can include S1+D1+A with a value of 12 and S2+D4+C with a value of 12, and bucket 3 can include S1+D2+A with a value of 24. As described in the SRCG processing method 40, the values are keyed to the (Source-Destination-Service Class). Assume, a new connection is added as SNC6 with S1, D1, Service Class A and value of 12. The bucket 2 will increment the value of S1+D1+A to 24.

Figure 5:
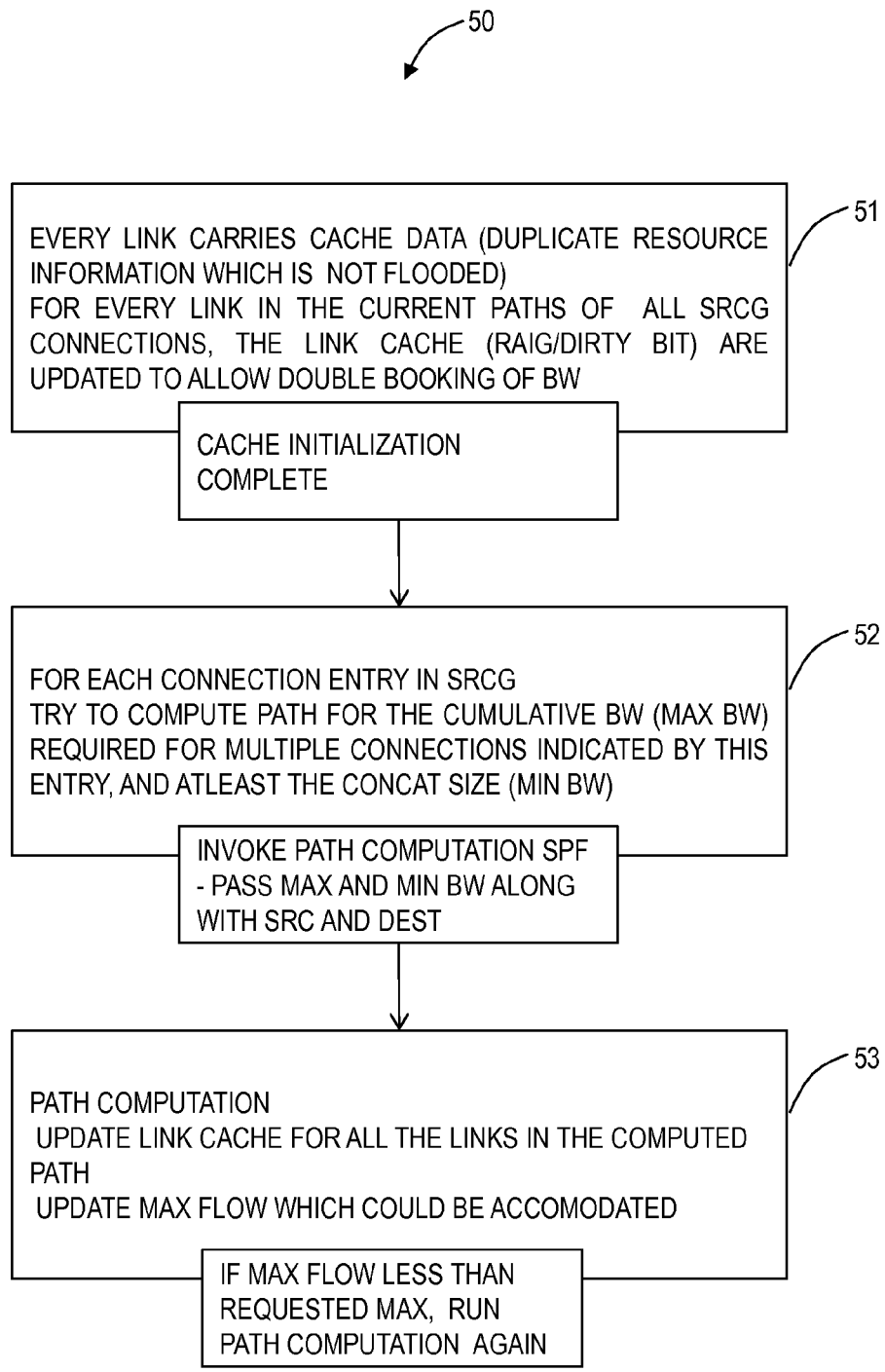
FIG. 5 is a flowchart of a protect path computation method.

Referring to FIG. 5, in an exemplary embodiment, a flowchart illustrates a protect path computation method 50. The path computation method 60 has an objective of collecting statistics and information over time from the control plane to be used during computation of protect paths for mesh restoration and/or redials. The statistics and information can include correlation data such as the SCRG information in the bucket list. The path computation method 50 seeks to provide deterministic behavior for mesh restoration for higher bandwidth connections relative to lower bandwidth connections. The path computation method 50 allows for an optimized way to redial a maximum number of connections (i.e., adds path computation overhead only in background for protect paths on nodes distributed across the network).

The protect path computation method 50 includes every link carries Cache Data (Duplicate resource information which is not flooded) and, for every link in the current paths of all SRCG connections, the Link Cache (RAIG/Dirty Bit) is updated to allow double booking of bandwidth (step 51). The Link Cache is used for temporary bandwidth calculation adjustments for one SRCG protect path computation. The lifespan of the Link Cache is when all protect path computations have been achieved for a particular SRCG. This is never flooded. Every link can carry cache Data as follows:
Cache Identifier: Failed Link Node+Port/LINK IG ID. (Not used)
Cache Dirty Bit: Identifies if Cache is Active
SONET/OTN RAIG: CacheAv/CacheAvConcat/CacheOduk etc.

The protect path computation method 50 includes, for each connection entry in the SRCG, trying to compute path for the cumulative bandwidth (MAX bandwidth) required for multiple connections indicated by this entry, and at least the concatenation size (MIN bandwidth) (step 52). The protect path computation method 50 invokes a path computation, e.g. shortest path first (SPF), performing a pass with max and min bandwidth along with the source and destination. The protect path computation method 50 can use the following pseudocode for optimized protect paths for the SRCG:

```
i. for (;pConnInSRCG; pConnInSRCG = pConnInSRCG->pNextConn)
    1.  for (Size = pBucketInSRCG->Size;pBucketInSRCG->Size &&
            Size ;requestBandwidth = Size)
        a.  maxFlow = ComputeDijkstraCacheEnabledMaxFlow
            (requestBandwidth, *protectPath,...)
        b.  if (maxFlow == 0) break; Size -= maxFlow;
        c.  SaveProtectPath (protectPath)
ii. ResetGlobalLinkCache
```

The protect path computation method 50 includes for the path computation, updating the Link Cache for all the links in the computed path and updating the Max flow which could be accommodated (step 53). If the max flow is less than the requested Max, run Path computation again. The path computation method 50 includes various inputs. These inputs include the port for the SRCG which is assumed as a failed link, a path calculation distribution, a max flow, a min flow, the SRCG bucket list in an ordered fashion, current working paths for each connection in the SRCG, and cache initialization. The path calculation distribution can be distributed in a master-slave manner where a master node (e.g., higher node ID) calculates protect paths for a particular link (in an adjacent node pair). This SRCG set protection paths are provided to the slave node via routing messages.

The max flow is the requested cumulative bandwidth and the min flow is the bucket size for the SRCG entry. The SRCG correlation data can be presented in an ordered fashion which can include source and destination pairs and associated service class and total size. The total size, as described herein, can be a cumulative size for all connections on a same head/tail (i.e., source/destination). The SRCG data can be ordered based on some rule, such as S1>S2>S3>S4, i.e. based on sources, for example. The current Working Paths for each connection in the SRCG can be included as part of the SETUP/CONNECT (or PATH-RESV) message and stored as part of each connection itself and used for Link Cache initialization in the path computation method 60.

In Cache initialization, when an SRCG link fails, connections can be re-routed on links that they were already on. This is to account for the fact that those links already supported those connections, this can include inflating the available bandwidth of those links by the amount used by those connections. This is to mimic double booking concept. Link cache bandwidth can be used for temporary bandwidth calculation adjustments for one SRCG protect path computation. The lifespan of the cache is when all protect path computations have been achieved for a particular SRCG. This is never flooded. Every link carries cache bandwidth data as follows: Cache Identifier: Failed Link Node+Port/LINK IG ID. (Not used); Cache Dirty Bit: Identifies if Cache is Active; and SONET/OTN RAIG: CacheAv/CacheAvConcat/CacheOduk etc. For every link in the current paths of all SRCG connections, the Link Cache (RAIG/Dirty Bit) are updated for double booking of bandwidth. For example, a Link (L1) in current path of a connection C1, updates the cache as: L1 Cache Raig: CacheDirtyBit=FALSE; CacheAvailable bandwidth=Link current Available bandwidth+Size of connection. Then, this link can be added to a global list of Cache Enabled Links: $gl_{13}$ LinkCache List.

Figure 6A:
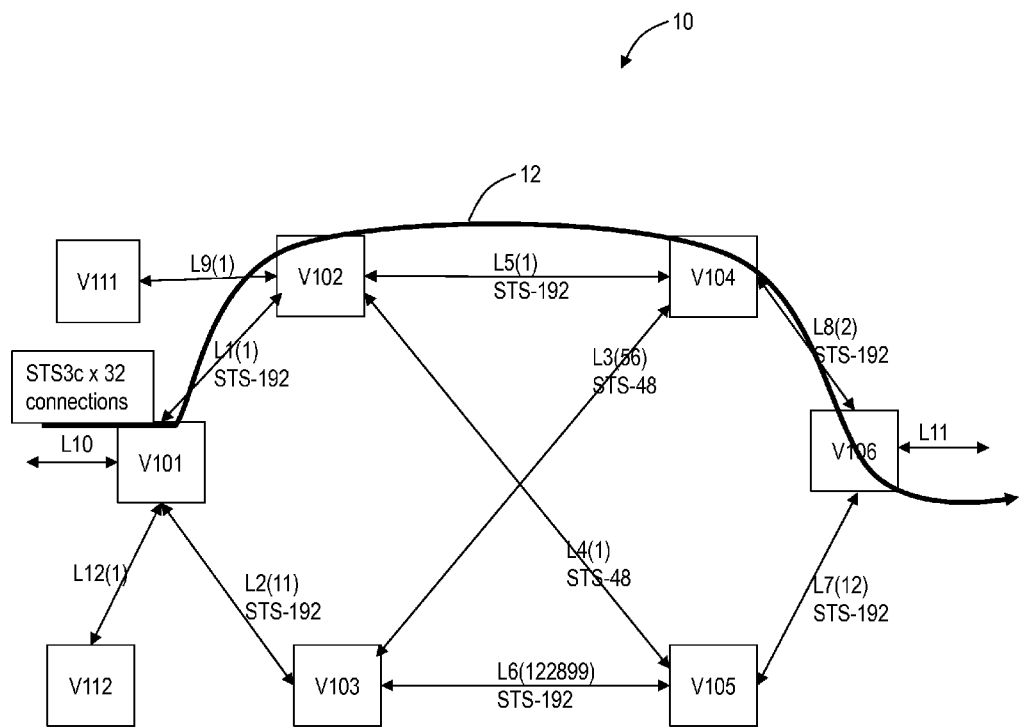
FIGS. 6A-6D are network diagrams of the network of FIG. 1 showing a similar example as FIGS. 2A-2G without crank-back for various connections using the methods of FIGS. 3-5.
Figure 6B:
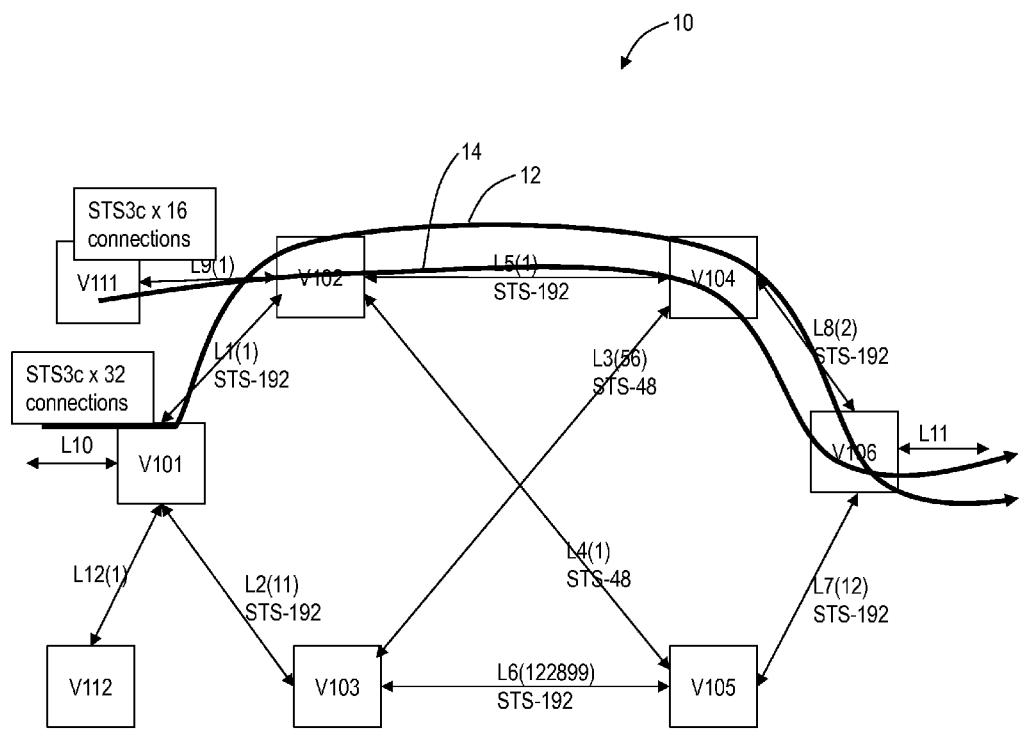
Figure 6C:
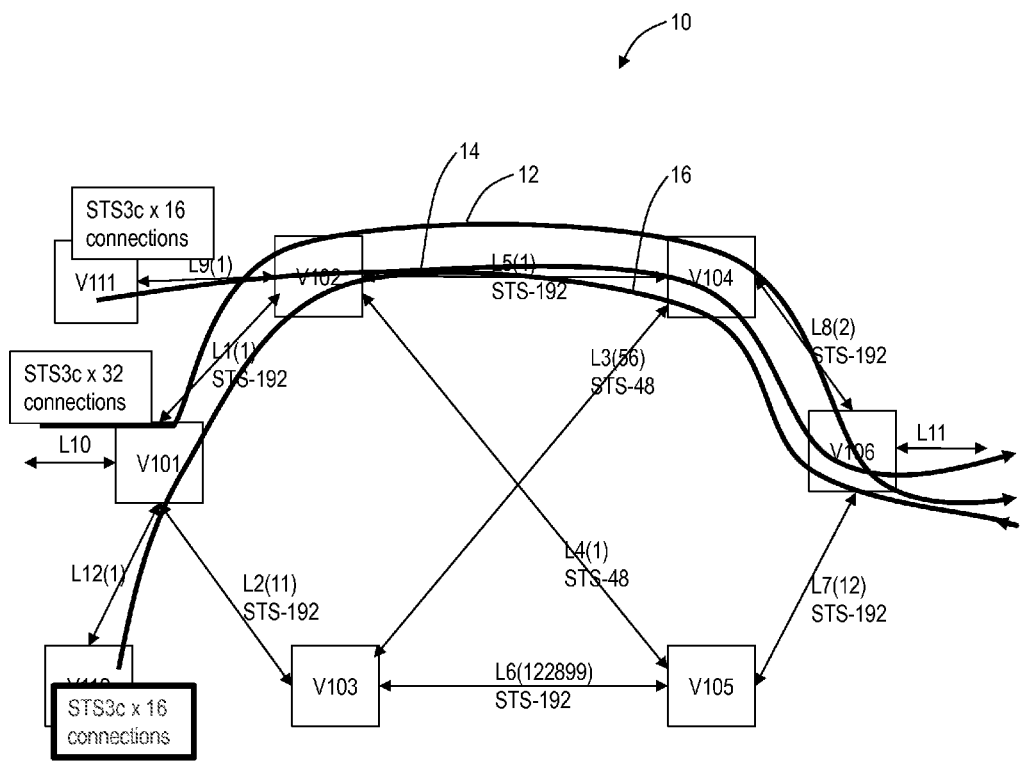

Referring to FIGS. 6A-6D, in an exemplary embodiments, network diagrams illustrates the network 10 showing the same exemplary network as FIGS. 2A-2G with no crank back due to the mesh restoration and bandwidth allocation systems and methods for shared risk connection groups. In FIG. 6A, similar to FIG. 2A, a first set of connections 12 is added with STS-3c×32 connections (i.e., 96 STS-1s or an STS-96) along a path including the nodes V101, V102, V104, V106. In FIG. 6B, similar to FIG. 2B, a second set of connections 14 is added with STS-3c×16 connections (i.e., 48 STS-1s or an STS-48) along a path including the nodes V111, V102, V104, V106. In FIG. 6C, similar to FIG. 2C, a third set of connections 16 is added with STS-3c×16 connections (i.e., 48 STS-1s or an STS-48) along a path including the nodes V112, V101, V102, V104, V106. Note, each of the set of connections 12, 14, 16 can be referred to as an SNC. Now, the link L5 is fully utilized, i.e. all STS-192s are taken with a total of 64 SNC connections (i.e. 32+16+16 from each of the set of connections 12, 14, 16), and it is a SRLG for the connections 12, 14, 16.

Thus, the link L5 is a SRCG set and can include the following data as described herein:
SRCG Set:
|1|Src: V101|Dest: V106|Sz:192|BuckSz:3
Protect Paths:
Path(connections 12): |N-111:L-122||N-102:L-250||N-105:L-560||N-106:L-0|| Cumulative Wt: (14): MaxFlow Value: 48
Path(connections 14): |N-112:L-121||N-101:L-130||N-103:L-340||N-104:L-460||N-106:L-0|| Cumulative Wt: (93): MaxFlow Value: 48
Path(connections 16): |N-101:L-130||N-103:L-350||N-105:L-560||N-106:L-0|| Cumulative Wt: (122911): MaxFlow Value: 96

Figure 6D:
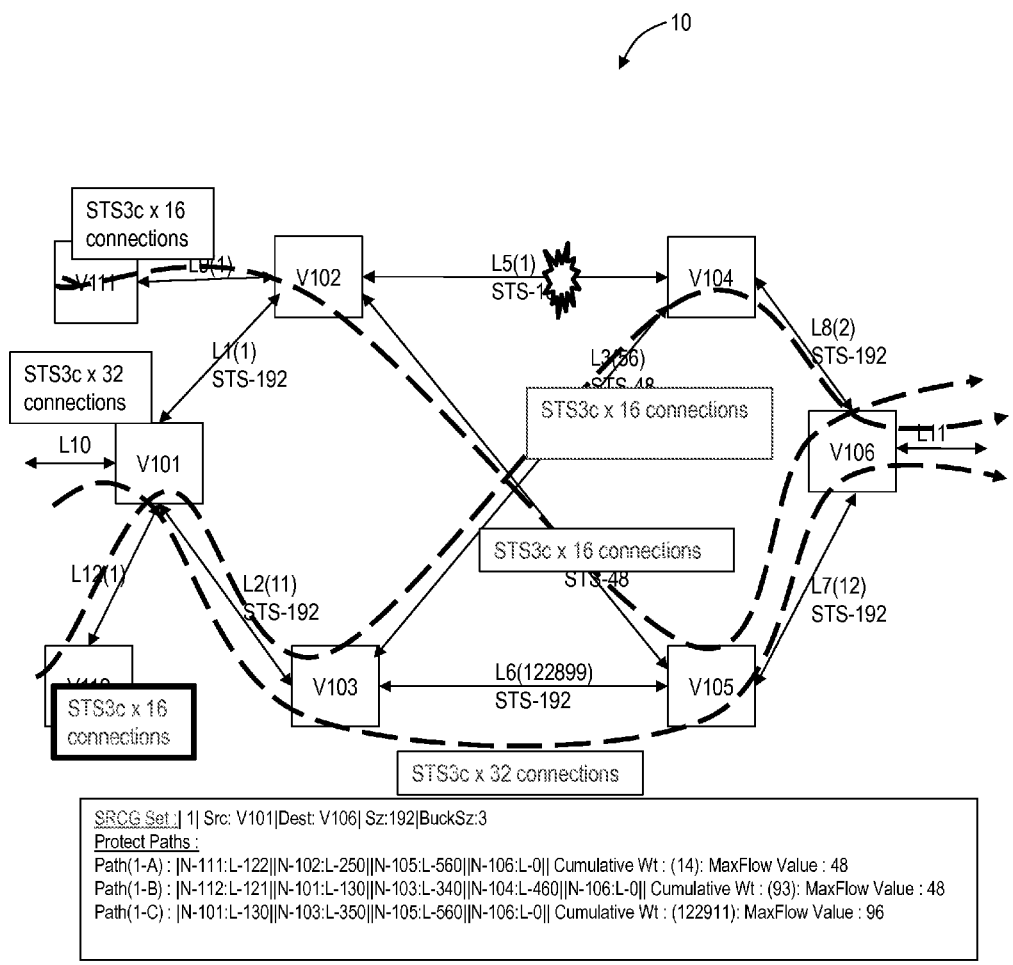

In FIG. 6D, similar to FIG. 2D, there is a fault 20 on the link L5 and each of the connections 12, 14, 16 is lost. However, unlike FIGS. 2D-2G, the SRCG set has precomputed protection paths for the members of the SRCG set. These explain all possible paths available to optimally route the connections 12, 14, 16 in preference to the size of the connections (getting higher priority to get routed and grab shorter paths) and avoid Network fragmentation. In this example if the ⅓ size connections were to fragment either of the Links (L1, L2, L9, L10), it would have failed a few 12/24 connections. If the same is used for protect path computations, crank-backs can be avoided for SNCs in the event of link failures, irrespective of the size of connections. The same algorithm uses max-flow approach to reduce the number of path computations between same source and destination as seen earlier (V101<>V106). The same algorithm uses min-max flow approach as tie breaker for equal admin weights paths during SPF run to reduce the number of path computations between same source and destination. It also tries to fit in maximum connections within a single path. Note it uses Link RAIG cache updates just like a write back cache on computers, just that it is never written back and left to routing updates later to do the same. Thus, no routing updates are required in this mechanism.

Protect path computation runs on all Intermediate/Originating nodes in the background periodically or based on SRCG change triggers. It does not impact the runtime performance of the network in the event of failure. This eliminates the need for Associated Hop Designated Transit List (DTL) provisioning done by customer periodically. The Protect Paths may not be completely disjoint and hence better optimized. In Case Protect Path is not found for a particular connection in a SRCG, and the intermediate node is not able to "advise" an alternate route in the Release message, the Source Node will redial as per the existing behavior. The SRLG can be assigned by user based on different criteria and this data can be used for Protect Path Calculation. A Node Failure can be accommodated by specifying common Risk ID to all the Links on the Node. On first attempt, this common Risk Id calculates disjoint paths and if that fails then include these links in Path Calculation. Periodicity/Frequency of the background Path Calculation depends on the priority of connection going on that link group. It can also be user configurable parameter.

Referring to FIG. 7, in an exemplary embodiment, a block diagram illustrates an exemplary node 100 for the mesh restoration and bandwidth allocation systems and methods. In an exemplary embodiment, the exemplary node 100 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the node 100 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 100 can be any digital system with ingress and egress digital signals and switching therebetween of channels, timeslots, tributary units, etc. utilizing OTN, SONET, SDH, etc. While the node 100 is generally shown as an optical network element, the mesh restoration and bandwidth allocation systems and methods contemplated for use with any switching fabric, network element, or network based thereon.

In an exemplary embodiment, the node 100 includes common equipment 110, one or more line modules 120, and one or more switch modules 130. The common equipment 110 can include power; a control module; operations, administration, maintenance, and provisioning (OAM&P) access; user interface ports; and the like. The common equipment 110 can connect to a management system 150 through a data communication network 160. The management system 150 can include a network management system (NMS), element management system (EMS), or the like. Additionally, the common equipment 110 can include a control plane processor configured to operate a control plane as described herein. The node 100 can include an interface 170 for communicatively coupling the common equipment 110, the line modules 120, and the switch modules 130 therebetween. For example, the interface 170 can be a backplane, mid-plane, a bus, optical or electrical connectors, or the like. The line modules 120 are configured to provide ingress and egress to the switch modules 130 and external to the node 100. In an exemplary embodiment, the line modules 120 can form ingress and egress switches with the switch modules 130 as center stage switches for a three-stage switch, e.g. a three stage Clos switch. Other configurations and/or architectures are also contemplated. The line modules 120 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, GbE PHY), 40 Gb/s (OC-768/STM-256, OTU3, ODU3, 40 GbE PHY), 100 Gb/s (OTU4, ODU4, 100 GbE PHY), etc.

Further, the line modules 120 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 120 can include wavelength division multiplexing interfaces, short reach interfaces, and the like, and can connect to other line modules 120 on remote network elements, end clients, edge routers, and the like. From a logical perspective, the line modules 120 provide ingress and egress ports to the node 100, and each line module 120 can include one or more physical ports. For example, the line modules 120 can form the links LXXX described herein. The switch modules 130 are configured to switch channels, timeslots, tributary units, etc. between the line modules 120. For example, the switch modules 130 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 130 can include redundancy as well, such as 1:1, 1:N, etc. In an exemplary embodiment, the switch modules 130 provide OTN, SONET, or SDH switching.

Those of ordinary skill in the art will recognize the node 100 can include other components which are omitted for illustration purposes, and that the systems and methods described herein are contemplated for use with a plurality of different network elements with the node 100 presented as an exemplary type of network element. For example, in another exemplary embodiment, the node 100 may not include the switch modules 130, but rather have the corresponding functionality in the line modules 120 (or some equivalent) in a distributed fashion. For the node 100, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, etc.

Figure 8:
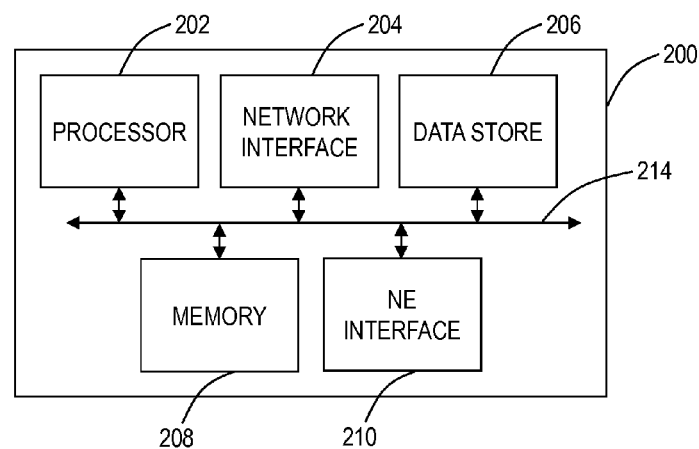
FIG. 8 is a block diagram of a controller to provide control plane processing and/or operations, administration, maintenance, and provisioning (OAM&P) for a node such as the node of FIG. 7.

Referring to FIG. 8, in an exemplary embodiment, a block diagram illustrates a controller 200 to provide control plane processing and/or operations, administration, maintenance, and provisioning (OAM&P) for a node such as the node 100. The controller 200 can be part of common equipment, such as common equipment '10 in the node 100. The controller 200 can include a processor 202 which is hardware device for executing software instructions such as operating the control plane. The processor 202 can be any custom made or commercially available processor, a central processing unit (CPU), an auxiliary processor among several processors associated with the controller 200, a semiconductor-based microprocessor (in the form of a microchip or chip set), or generally any device for executing software instructions. When the controller 200 is in operation, the processor 202 is configured to execute software stored within memory, to communicate data to and from the memory, and to generally control operations of the controller 200 pursuant to the software instructions. The controller 200 can also include a network interface 204, a data store 206, memory 208, a network element interface 210, and the like, all of which are communicatively coupled therebetween and with the processor 202.

The network interface 204 can be used to enable the controller 200 to communicate on a network, such as to communicate control plane information to other controllers, to the management system 160, and the like. The network interface 204 can include, for example, an Ethernet card (e.g., 10BaseT, Fast Ethernet, Gigabit Ethernet) or a wireless local area network (WLAN) card (e.g., 802.11a/b/g). The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202.

The network element interface 210 includes components for the controller 200 to communicate to other devices in a node, such as through the local interface 170. The components (202, 204, 206, 208, 210) are communicatively coupled via a local interface 214. The local interface 214 and the network element interface 210 can be, for example but not limited to, one or more buses or other wired or wireless connections, as is known in the art. The local interface 214 and the network element interface 210 can have additional elements, which are omitted for simplicity, such as controllers, buffers (caches), drivers, repeaters, and receivers, among many others, to enable communications. Further, the local interface 214 and the network element interface 210 can include address, control, and/or data connections to enable appropriate communications among the aforementioned components.

In conjunction with the node 100 and the controller 200, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Figure 9:
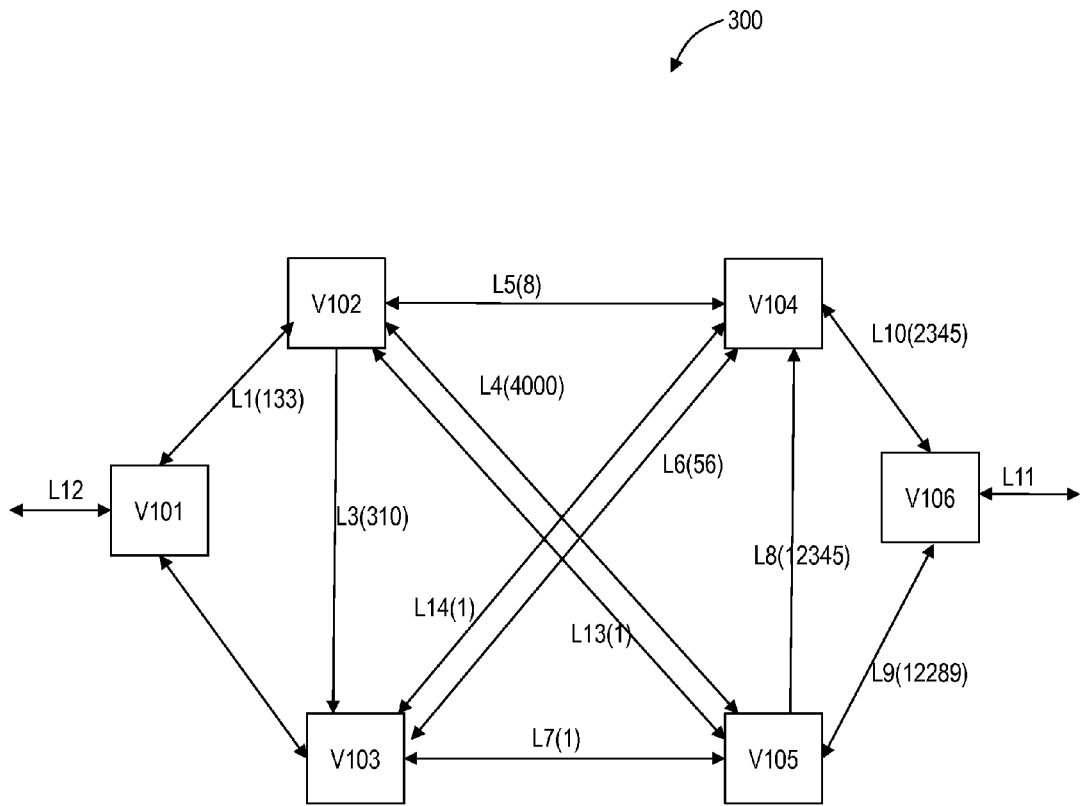
FIG. 9 is a network diagram of another network of multiple nodes (V101-V106) and links (L1-L14).

Referring to FIG. 9, in an exemplary embodiment, a network diagram illustrates another network 300 of multiple nodes (V101-V106) and links (L1-L14). For an exemplary operation, lets apply a simulation to optimally route the following SRCG in the network 300:

|0|Src: V101|Dest: V106|Sz:24|BuckSz:24
|1|Src: V101|Dest: V106|Sz:24|BuckSz:12
|2|Src: V101|Dest: V106|Sz:12|BuckSz:3
|3|Src: V101|Dest: V106|Sz:24|BuckSz:1

In the following, N-NNN signifies Node NNN and L-ABP signifies Link between A,B=Node %100 P means port 0, 1 . . .

optical-computation-engine>shpcomp
PATH (0): |N-101:L-130||N-103:L-341||N-104:L-460||N-106:L-0|| Cumulative Wt: (2357): MaxFlow Value: 24
PATH (1-A): |N-101:L-130||-103:L-341||-104:L-460||-106:L-0|| Cumulative Wt: (2357): MaxFlow Value: 12
PATH (1-B): |N-101:L-120||N-102:L-251||N-105:L-560||N-106:L-0|| Cumulative W t: (12623): MaxFlow Value: 12
PATH (2-A): |N-101:L-130||N-103:L-341||N-104:L-460||N-106:L-0|| Cumulative Wt: (2357): MaxFlow Value: 6
PATH (2-B): |N-101:L-120||N-102:L-251||N-105:L-560||N-106:L-0|| Cumulative Wt: (12623): MaxFlow Value: 6
PATH (3-A): |N-101:L-130||N-103:L-341||N-104:L-460||N-106:L-0|| Cumulative Wt: (2357): MaxFlow Value: 2
PATH(3-B): |N-101:L-120||N-102:L-251||N-105:L-560||N-106:L-0|| Cumulative Wt: (12623): MaxFlow Value: 22

Thus, only 7 Path computation suffice for 31 connections in the given example above.

In another example using the network 300, lets apply a simulation to optimally route the following SRCG in the given network 300:

|0|Src: V102|Dest: V104|Sz:24|BuckSz:24
|1|Src: V102|Dest: V105|Sz:24|BuckSz:24
|2|Src: V101|Dest: V106|Sz:24|BuckSz:24
|3|Src: V101|Dest: V106|Sz:24|BuckSz:12
|4|Src: V101|Dest: V106|Sz:12|BuckSz:3
|5|Src: V101|Dest: V106|Sz:24|BuckSz:1

PATH (0): |N-102:L-251||N-105:L-530||N-103:L-341||N-104:L-0|| Cumulative Wt: (3): MaxFlow Value: 24
PATH (1): |N-102:L-250||-105:L-0|| Cumulative Wt: (4000): MaxFlow Value: 24
PATH (2): |N-101:L-130||N-103:L-340||N-104:L-460||N-106:L-0|| Cumulative Wt: (2412): MaxFlow Value: 24

PATH (3-A): |N-101:L-130||N-103:L-341||N-104:L-460||N-106:L-0|| Cumulative Wt: (2357): MaxFlow Value: 12
PATH (3-B): |N-101:L-120||N-102:L-251||N-105:L-560||N-106:L-0|| Cumulative Wt: (12623): MaxFlow Value: 12
PATH (4-A): |N-101:L-130||N-103:L-341||N-104:L-460||N-106:L-0|| Cumulative Wt: (2357): MaxFlow Value: 6
PATH (4-B): |N-101:L-120||N-102:L-251||N-105:L-560||N-106:L-0|| Cumulative Wt: (12623): MaxFlow Value: 6
PATH (5-A): |N-101-130||N-103-341||N-104:L-460||N-106-L-0|| Cumulative Wt: (2357): MaxFlow Value: 2
PATH (5-B): |N-101:L-120||N-102:L-251||N-105:L-560||N-106:L-0|| Cumulative Wt: (12623): MaxFlow Value: 2
PATH (5-C): |N-101:L-120||N-102:L-240||N-104:L-430||N-103:L-350||N-105:L-560||N-106:L-0|| Cumulative Wt: (12687): MaxFlow Value: 20

Only 10 Path computations suffice for 33 connections in the above example.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method, comprising:
receiving a setup message for a new connection via a source routing control plane on a network, wherein the new connection connects a source node to a destination node via at least one intermediate node;
categorizing the new connection in a shared risk connection group (SRCG) during call setup of the new connection;
computing one or more protect paths in the background at the intermediate node in the network associated with the SRCG, wherein the one or more protect paths are utilized to avoid crank-backs and to minimize bandwidth fragmentation due to the SRCG;
storing the one or more protect paths at the intermediate node;
responsive to a failure affecting the SRCG:
releasing all connections including the new connection in the SRCG via signaling at the intermediate node; and
providing the stored one or more protect paths to source nodes associated with the connections.

2. The method of claim 1, further comprising:
at the source node for each of the connections, utilizing the stored one or more protect paths for optimal route selection in restoring each of the connections.

3. The method of claim 1, wherein the source routing control plane is configured to perform path computation at the source node of the new connection.

4. The method of claim 1, further comprising:
periodically computing one or more protect paths in the background at the intermediate node.

5. The method of claim 1, further comprising:
computing the one or more protect paths based on the size of each of the connections to avoid fragmentation.

6. The method of claim 5, further comprising:
computing the one or more protect paths utilizing a max-flow approach, to reduce a number of path computations between same source and destination.

7. The method of claim 6, further comprising:
computing the one or more protect paths utilizing the max-flow approach as a tie breaker for equal admin weights paths during a shortest path first run, to reduce the number of path computations between same source and destination.

8. The method of claim 1, further comprising:
preventing routing updates related to the stored one or more protect paths until release signaling is required.

9. An intermediate node, comprising:
at least one port associated with a link on a network;
switching circuitry communicatively coupled to the at least one port for switching connections thereto;
a controller communicatively coupled to the at least one port and the switching circuitry; and
memory configured to store instructions that, when executed, cause the controller to:
operate a source routing control plane on the network;
receive a new connection message via call setup with the new connection being categorized as part of a shared risk connection group (SRCG), wherein the new connection connects a source node to a destination node via at least the intermediate node;
compute one or more protect paths in the background, wherein the one or more protect paths are utilized to avoid crank-backs and to minimize bandwidth fragmentation due to the SRCG;
store the one or more protect paths;
responsive to a failure affecting the SRCG:
release all connections including the new connection in the SRCG via signaling; and
provide the stored one or more protect paths to source nodes associated with the connections.

10. The node of claim 9, wherein each of the source node for each of the connections is configured to utilize the stored one or more protect paths for optimal route selection in restoring each of the connections.

11. The node of claim 9, wherein the source routing control plane is configured to perform path computation at a source node of the new connection.

12. The node of claim 9, wherein the instructions, when executed, further cause the controller to:
periodically compute one or more protect paths in the background.

13. The node of claim 9, wherein the instructions, when executed, further cause the controller to:
compute the one or more protect paths based on the size of each of the connections to avoid fragmentation.

14. The node of claim 13, wherein the instructions, when executed, further cause the controller to:
compute the one or more protect paths utilizing a max-flow approach to reduce a number of path computations between same source and destination.

15. The node of claim 14, wherein the instructions, when executed, further cause the controller to:
compute the one or more protect paths utilizing the max-flow approach as a tie breaker for equal admin weights paths during a shortest path first run to reduce the number of path computations between same source and destination.

16. The node of claim 9, wherein the instructions, when executed, further cause the controller to:
prevent routing updates related to the stored one or more protect paths until release signaling is required.

17. A network, comprising:
a plurality of nodes interconnected therebetween by a plurality of links; and
a source routing control plane operating between the plurality of nodes, wherein the source routing control plane is configured to perform path computation at a source node of a connection, and wherein one or more intermediate nodes are configured to:

operate a source routing control plane on the network;

receive a new connection message via call setup with the new connection being categorized as part of a shared risk connection group (SRCG), wherein the new connection connects a source node to a destination node via the one or more intermediate nodes;

compute one or more protect paths in the background, wherein the one or more protect paths are utilized to avoid crank-backs and to minimize bandwidth fragmentation due to the SRCG:

store the one or more protect paths;

responsive to a failure affecting the SRCG:
- release all connections including the new connection in the SRCG via signaling; and
- provide the stored one or more protect paths to source nodes associated with the connections.

* * * * *